(12) United States Patent
Tajima (10) Patent No.: US 6,928,231 B2
(45) Date of Patent: Aug. 9, 2005

(54) METHOD AND SYSTEM FOR VIDEO RECORDING AND COMPUTER PROGRAM STORING MEDIUM THEREOF

(75) Inventor: Johji Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 1006 days.

(21) Appl. No.: 09/822,513

(22) Filed: Apr. 2, 2001

(65) Prior Publication Data

US 2001/0031129 A1 Oct. 18, 2001

(30) Foreign Application Priority Data

Mar. 31, 2000 (JP) ........................................ 2000-099627

(51) Int. Cl.$^7$ ............................ H04N 5/91; H04N 7/18
(52) U.S. Cl. ............................ 386/46; 386/96; 348/143
(58) Field of Search ............................ 386/46, 55, 95, 386/96, 104, 105, 107, 117, 124, 125, 1, 4; 360/32, 13; 348/143; H04N 5/91, 7/18

(56) References Cited

U.S. PATENT DOCUMENTS

| 6,038,333 A | * | 3/2000 | Wang | 382/118 |
| 6,546,185 B1 | * | 4/2003 | Kim et al. | 386/46 |
| 2002/0136433 A1 | * | 9/2002 | Lin | 382/118 |

FOREIGN PATENT DOCUMENTS

| JP | 61-289474 | 12/1986 |
| JP | 63-118473 | 5/1988 |
| JP | 3-127263 | 5/1991 |
| JP | 6-73949 | 3/1994 |
| JP | H09-9199 | 1/1997 |
| JP | 9-35069 | 2/1997 |
| JP | H09-74299 | 3/1997 |
| JP | 9-282282 A | 10/1997 |
| JP | 11-46343 A | 2/1999 |
| JP | 11-259507 A | 9/1999 |

OTHER PUBLICATIONS

S. Chippingdale et al.; "A Unified Approach to Video Face Detection, Tracking and Recognition", International Conference on Image Processing, Oct. 24–28, 1999, pp. 662–666 with Abstract.

S. Akamatsu, "Recent Research of Face Recognition by Computer", Journal of the Institute of Electronics, Information and Communication Engineers, vol. 80, No. 3, (1997), pp. 257–266 with Abstract.

* cited by examiner

Primary Examiner—Robert Chevalier
(74) Attorney, Agent, or Firm—Sughrue Mion, PLLC

(57) ABSTRACT

A method and a system for video recording, in which scenes desired by a user can be recorded, are provided. Even at a case that the user sets the starting time and the ending time of a program beforehand and its broadcasting time is changed, and at a case that the user does not know the contents of the program in detail, the program or the scenes desired by the user can be recorded by the method and the system. The method for video recording provides the steps of; detecting an inputted face image from a video signal composed of plural frames, identifying the inputted face image with an inquiring face image designated by a user, and recording video signals including frames before and after a frame in which the inquiring face image appears for designated minutes when identification between the inputted face image and the inquiring face image was successful, or not recording video signals including frames before and after a frame in which the inquiring face image appears for designated minutes when identification between the inputted face image and the inquiring face image was successful.

24 Claims, 3 Drawing Sheets

METHOD AND SYSTEM FOR VIDEO RECORDING AND COMPUTER PROGRAM STORING MEDIUM THEREOF

BACKGROUND OF THE INVENTION

The present invention relates to a method and a system for video recording, and a computer program storing medium thereof. In particular, when a designated object or a designated face image is detected from inputted video signals, video signals in which the designated object or the designated face image appears are selectively recorded or not recorded by using the method and the system.

DESCRIPTION OF THE RELATED ART

Conventionally, at a case that a user desires to record a TV broadcast program, the user switches on a recording button of a video recording appliance while the user is watching the TV broadcast program. Or the user looks at a program list beforehand and sets the broadcast channel and the time to be broadcast by using a record reserving function of the video recording appliance, and after recording, the user watches the TV program by making the TV program display on a display based on so-called a time-shift function.

As a first conventional technology, the Japanese Patent Application Laid-Open No. SHO 61-289474 discloses a recognition apparatus. This recognition apparatus is used such as to recognize a person at a gate of a company for its security. And at this recognition apparatus, the face of the person, and recognition information such as a fingerprint and a voice print of the person are recorded in a video floppy disk beforehand, and are compared with the person to be recognized at the gate of the company. And when the person is not equal to the recorded information, the person is refused to enter the company and the video floppy disk is not ejected, and further the information to be recognized is recorded in the video floppy disk. With this, the recognition is executed mechanically and completely, and the evidence for false use can be kept.

And as a second conventional technology, the Japanese Patent Application Laid-Open No. SHO 63-118473 discloses a door locking and unlocking apparatus used a video camera, in which a video process is applied to open a door without using a mechanical key such as for a building or a car. And at this application, the door is opened when newly inputted data are equal to reference data memorized beforehand. In order to achieve this, the door locking and unlocking apparatus used a video camera provides an image taking means that transforms the face of a person staying at the position near to an entrance door for cars into video signals, a feature extracting means that makes feature data of the person from the distance between right and left eyes, the shape of the eyes such as the vertical and horizontal widths of the eyes, and the positions of the eyes, by using the inputted video signals, and a recognition judging means that judges whether the feature data inputted newly are equal to the feature data memorized beforehand in a memory or not, and outputs a door opening instruction when the judged result is the same.

And as a third conventional technology, the Japanese Patent Application Laid-Open No. HEI 3-127263 discloses an automatic teller machine (ATM) which is used at such as banks. At this ATM, a person is identified by using a face-photograph taken by a video camera and a face-photograph on a document such as an ID card. With this, opening/closing an account can be executed automatically by the machine, and some window jobs at the bank can be simplified.

And as a fourth conventional technology, the Japanese Patent Application Laid-Open No. HEI 6-73949 discloses a user recording apparatus. This user recording apparatus takes a used record of equipment such as safety-deposit boxes that can be used by specified users. This user recording apparatus provides at least two video cameras, and one camera takes identification information of a user, and the other camera takes the face-photograph of the user, by switching over these two video cameras in order. And the taken information by these two video cameras is related with each other and recorded in a video tape recorder (VTR) that works based on a video system control architecture (VISCA) protocol for controlling the VTR by a personal computer. The information taken by these two video cameras is recorded by adding attached information, such as, the used data and time and tape counting information by an on screen display (OSD).

And as a fifth conventional technology, the Japanese Patent Application Laid-Open No. HEI 9-35069 discloses an apparatus and a method for video signal coding. At this application, in order to detect an object to be taken automatically for coding video signals, at a video signal coding by a low bit rate by the CCITT recommended standard H. 261, the external shape of face and the positions of features of face of a person to be taken are automatically detected by using an approximate model specified by a closed curve and are coded by a relatively high bit rate, and a part except the face and features of the face is coded by a relatively low bit rate. With this, an image of the face and the features of the face can be taken as relatively good coded quality and transmitted, therefore the quality and efficiency of mutual communication among persons on displays such as at a TV conference are improved. And a good expression of the features of the face can be obtained, therefore, it is also an advantage for hearing handicapped persons depending on lip reading.

However, at the conventional first to fifth technologies mentioned above, the object is to apply to security, and an application to video recording is not described in detail. At the first conventional technology, in order to identify a person, the face and the fingerprint and the voice print are used, and when the person is not recognized, the information not recognized is outputted, and information to be recognized is recorded, but video recording is not described. And at the second conventional technology, it is judged whether the face image is equal to the face image memorized beforehand or not. And at the third conventional technology, the face of a person is checked with such as his/her driver's license having his/her own face-photograph. And at the fourth conventional technology, the face is not identified and only a used record of a user is recorded for the purpose of security. And at the fifth conventional technology, detecting features of a face is deeply studied, and the features of the face are specified to such as eyes and mouth, however, the recording of the information is not described.

Further, not for the purpose of the security, and from a viewpoint of application of video recording, only video recording by a time shift is not sufficient for users.

For example, even when it is known that a special TV personality appears on a part of a long TV program, generally, its actual appearance time is not informed, consequently, it may fail to record scenes that the special TV personality appears. Especially, at a case that the recording medium has not enough recording capacity, when a user desires to record only scenes before and after and during that the special TV personality appears, probability that the user fails to record the scenes becomes high. And at a case that the user desires to record a specified commercial message inserted in a program, it is very difficult for the user to reserve to record only this specified commercial message, and the user must record all the scenes that the specified commercial message may appear. In this case, a recording medium such as a video tape is used longer than its necessity, and is used wastefully from a viewpoint of its effective use in time and physically. Further, when a sponsor who presented a program desires to know whether an actual broadcast time of its commercial message is equal to the predetermined time or not, if the actual broadcast of the commercial message can be recorded, it is convenient for the sponsor to be able to confirm it. And this is necessary for the broadcast industry including sponsors being clients to the broadcast business. However, this kind of equipment does not exist, and it has been required to have a system and an method that can realize this recording system.

SUMMARY OF THE INVENTION

It is therefore an object of the present invention to provide a method and a system for video recording, in which a special cast appearing on a TV program is recognized, and frames in which the special cast is appearing and frames before and after the frames in which the special cast is appearing are recorded, or a part of a TV program is not recorded.

According to a first aspect of the present invention for achieving the object mentioned above, there is provided a method for video recording. The method for video recording provides the steps of; detecting an inputted face image from a video signal composed of plural frames, identifying the inputted face image with an inquiring face image designated by a user, and recording video signals including frames before and after a frame in which the inquiring face image appears for designated minutes when identification between the inputted face image and the inquiring face image was successful.

According to a second aspect of the present invention, there is provided a method for video recording. The method for video recording provides the steps of detecting an inputted face image from a video signal composed of plural frames, identifying the inputted face image with an inquiring face image designated by a user, and not recording video signals including frames before and after a frame in which the inquiring face image appears for designated minutes when identification between the inputted face image and the inquiring face image was successful.

According to a third aspect of the present invention, there is provided a system for video recording that records video signals including frames before and after a frame in which an object to be recorded appears for designated minutes by detecting the object to be recorded. The system for video recording provides an object to be recorded detecting means for detecting feature points of the object to be recorded from an inputted video signal, an object to be recorded normalizing means for normalizing the object to be recorded by utilizing the feature points of the object to be recorded, an inquiring image designating means for designating an inquiring image beforehand and normalizing the inquiring image and outputting the normalized inquiring image, an object identifying means for identifying the normalized object to be recorded with the normalized inquiring image, and a controlling means for controlling video recording based on the result of the object identifying means.

According to a fourth aspect of the present invention, there is provided a computer program storing medium of a method for video recording that records video signals when a designated object is detected from an inputted video signal. The computer program storing medium of the method for video recording provides the steps of; detecting the designated object from plural frames of the inputted video signal, identifying the designated object with an inquiring image designated by a user, and recording video signals including frames before and after a frame in which the inquiring image appears for designated minutes when identification between the designated object and the inquiring image was successful.

According to a fifth aspect of the present invention, there is provided a computer program storing medium of a method for video recording that records video signals when a designated object is detected from an inputted video signal. The computer program storing medium of the method for video recording provides the steps of; detecting the designated object from plural frames of the inputted video signal, identifying the designated object with an inquiring image designated by a user, and not recording video signals including frames before and after a frame in which the inquiring image appears for designated minutes when identification between the designated object and the inquiring image was successful.

According to a sixth aspect of the present invention, there is provided a method for audio recording. The method for audio recording provides the steps of; detecting a phrase of designated minutes continuously from an inputted audio signal, identifying the detected phrase of the designated minutes with a phrase of the same designated minutes of an inquiring audio signal designated by a user, and recording audio signals including phrases before and after a phrase in which the inquiring audio signal appears for designated minutes when identification between the phrase of the inputted audio signal and the phrase of the inquiring audio signal was successful.

According to a seventh aspect of the present invention, there is provided a method for picture recording. The method for picture recording provides the steps of; delaying inputted picture signals, separating the inputted picture signals into video signals and audio signals, dividing each of the video signals into frames, normalizing the video signals based on feature points in the frames, dividing each of the audio signals into phrases of designated minutes, normalizing the audio signals based on levels in the designated minutes, using at least either one, an inquiring image designated beforehand or an inquiring voice of the designated minutes designated beforehand, normalizing at least either one, the inquiring image designated beforehand or the inquiring voice of the designated minutes designated beforehand, identifying at least either one, the normalized video signal or the normalized audio signal, with at least either one, the normalized inquiring image or the normalized inquiring voice, and recording or not recording the picture signals for predetermined minutes from certain minutes before the time when identification was successful to after the time at the case that the identification was successful.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
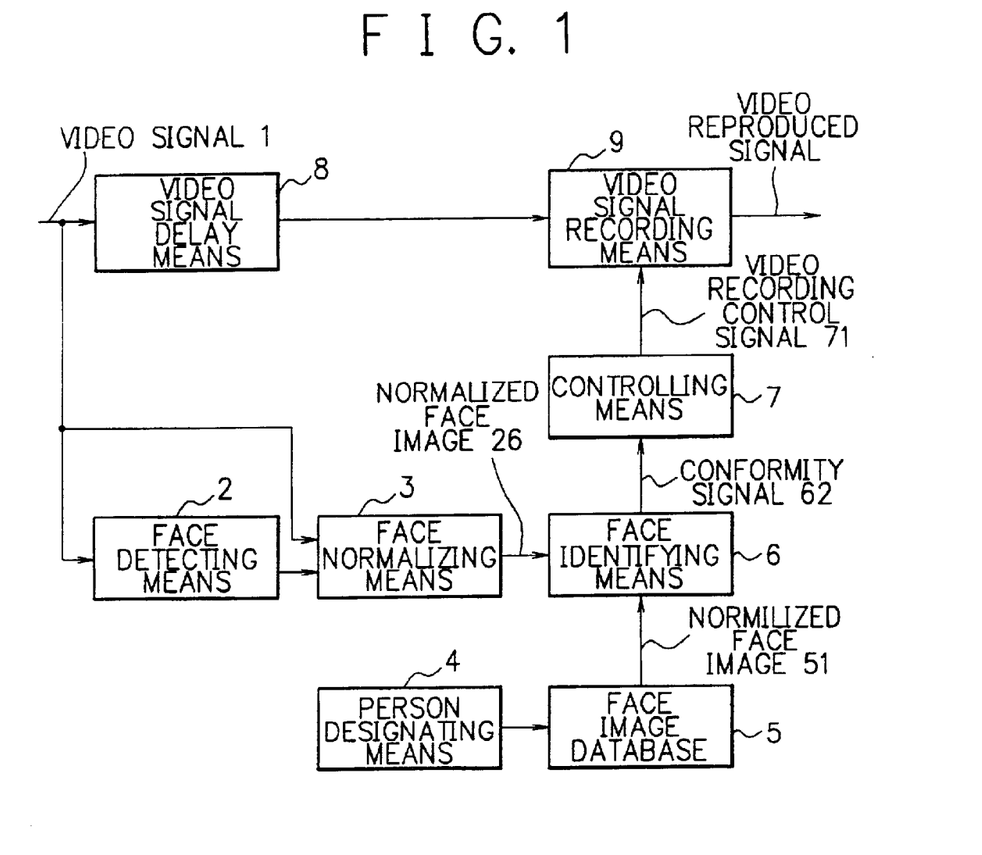
FIG. 1 is a block diagram showing a structure of a first embodiment of a system for video recording of the present invention.

Referring now to the drawings, embodiments of the present invention are explained in detail. FIG. 1 is a block diagram showing a structure of a first embodiment of a system for video recording of the present invention. As shown in FIG. 1, the first embodiment of the system for video recording of the present invention consists of a face detecting means 2, a face normalizing means 3, a person designating means 4, a face image database 5, a face identifying means 6, a controlling means 7, a video signal delay means 8, and a video signal recording means 9.

Referring to FIG. 1, operation of the first embodiment of the system for video recording of the present invention is explained. First, a video signal 1 is inputted to the face detecting means 2, the face normalizing means 3, and the video signal delay means 8. This video signal 1 is a video signal outputted from a TV tuner (not shown), or a video signal outputted from an image taking device such as a video camera (not shown), and is generally inputted to a video input terminal of a recording apparatus at the time when the video signal is recorded. In this, in order to make the explanation concise, the signal is described as the video signal, however, usually the video signal includes an audio signal, and its handling is the same when the audio signal is included in the video signal. The video signal 1 consists of sequential pictures of 30 frames per second, and any of cases that the picture is a still picture or a moving picture or a combination of both pictures can be handled.

The face detecting means 2 detects the size and position of a face of a person from the inputted video signal 1. The face normalizing means 3 normalizes the face of the person in the video signal 1 by using the detected result at the face detecting means 2, for example, by making the distance between pupils of both eyes a predetermined value, and outputs a normalized face image 26 to the face identifying means 6. The person designating means 4 designates a specified desiring person from a face image database 6 on a display (not shown). Next, a face image of the specified person being an inquired person is normalized and a normalized face image 51 is inputted to the face identifying means 6. The face identifying means 6 compares the inputted normalized face image 26 with the inquiring normalized face image 51 outputted from the face image database 5, and detects whether the both normalized face images are conformed or not, or detects the degree of similarity as a value, such as, the similarity of the both normalized face images is much higher than a designated value, and the similarity is approximate in a degree that the difference is not recognized, and outputs a conformity signal 62 based on detected result at the face identifying means 6 being the degree of similarity of the two normalized face images 26 and 51. The controlling means 7 outputs a video recording control signal 71 that instructs the video signal recording means 9 to record/stop recording a video signal outputted from the video signal delay means 8, based on instructions decided beforehand that instructs to record or stop recording corresponding to the conformity signal 62 that signifies the degree of similarity. The video signal recording means 9 records or stop recording the video signal outputted from the video signal delay means 8 based on the video recording control signal 71 outputted from the controlling means 7. And the video signal recording means 9 outputs the recorded video signal to a display (not shown) as a reproduced video signal, when the video signal recording means 9 is instructed to reproduce the recorded video signal. With this, video information in which a designated special person is appearing on the screen can be obtained during his/her appearance and including before and after his/her appearance.

Figure 2:
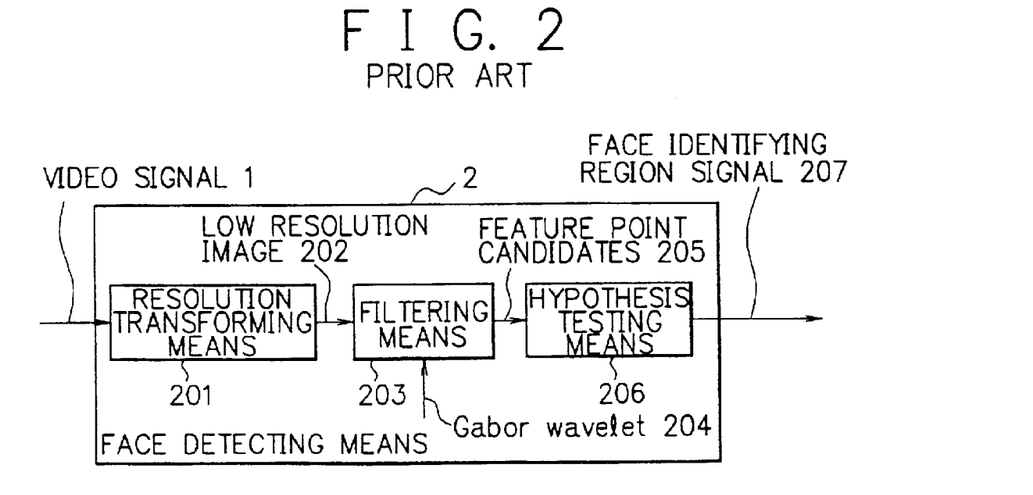
FIG. 2 is a block diagram showing a structure of a face detecting means using at the first embodiment of the system for video recording of the present invention.

Next, referring to a drawing, each means is explained in detail. The face detecting means 2 detects a face image of a person from an inputted video signal 1. An existing technology can be used to detect a face image, by detecting such as a skin color, a movement of the face, and a shade variance of the face. FIG. 2 is a block diagram showing a structure of the face detecting means 2 using at the first embodiment of the system for video recording of the present invention. And an existing technology is used for this face detecting means 2. This technology is described in a technical report, written by S. Clippingdale et al., "A Unified Approach to Video Face Detection, Tracking and Recognition", International Conference on Image Processing, 1999, October pp. 662–666.

Referring to FIG. 2, operation of the face detecting means 2 of the first embodiment of the system for video recording of the present invention is explained. The face detecting means 2 consists of a resolution transforming means 201, a filtering means 203, and a hypothesis testing means 206. First, the original resolution of the video signal 1 is transformed into a low resolution image 202 being coarse that is enough at a detecting process of a face image at the resolution transforming means 201. The filtering means 203 makes a Gabor wavelet 204 apply to the low resolution image 202. The Gabor wavelet is a filter shown in an equation (1) and a convolution is calculated as making each pixel position at center. And feature point candidates 205, such as the ends of right eye, the ends of left eye, the ends of lip, are obtained from the output of the filtering means 203 by filtering for each orientation n and resolution r $$g_n^r(x) = \frac{k_r^2}{\sigma^2} \exp\left(-\frac{k_r^2 \|x\|^2}{2\sigma^2}\right) \times \left[\exp(i(k_n^r)^T x) - \exp\left(-\frac{\sigma^2}{2}\right)\right] \quad (1)$$

where the 2-D spatial frequency of the wavelet at resolution r and orientation n is given by $$k_n^r = k_r \begin{pmatrix} \cos(n\pi/N_{oms}) \\ \sin(n\pi/N_{oms}) \end{pmatrix}, \begin{array}{l} 0 \le n < N_{oms} \\ 0 \le r < N_{resns} \end{array}$$

Next, the hypothesis testing means 206 tests the relation of positions of feature points of the face image for the feature point candidates 205, and outputs a face identifying region signal 207. At detecting the feature points, the testing of the feature points can be easily made by storing the differences among the feature points in a table beforehand. For example, at a case of a comparison between feature points, that is, when the end of eye is compared with a pupil in the 2-D spatial frequency, there is no high or low frequencies at the end of eye in the horizontal orientation, but the spatial frequency at the pupil is low in the horizontal orientation. And the spatial frequency at the end of eye is high in the vertical orientation, and the spatial frequency at the pupil is low in the vertical orientation. As mentioned above, the face detecting means 2 detects the positions of parts looking like face, and outputs the face identifying signal 207.

Figure 3:
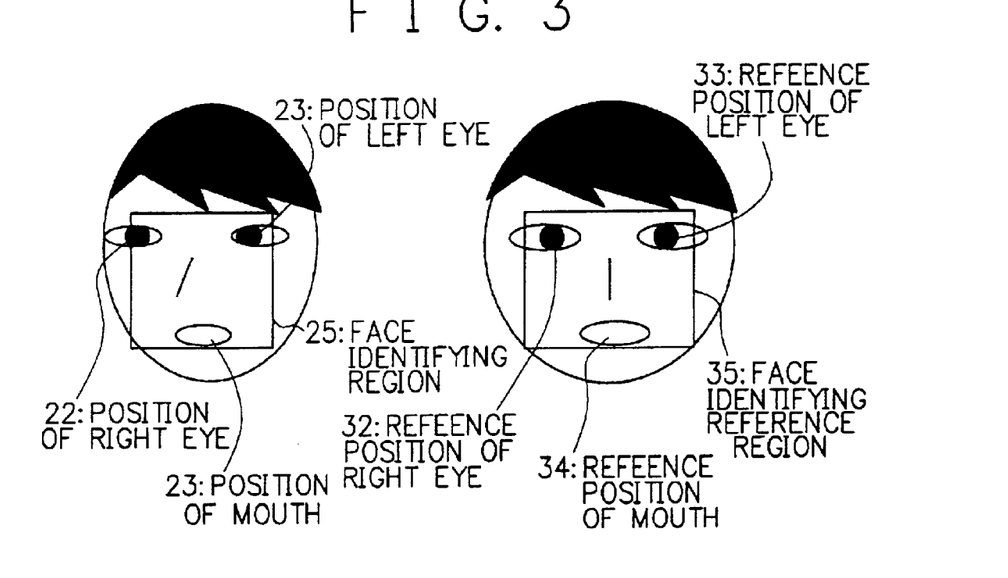
FIG. 3 is a diagram showing feature points of a face detected by the face detecting means and feature points of a face normalized by a face normalizing means of the first embodiment of the system for video recording of the present invention.

FIG. 3 is a diagram showing feature points of a face detected by the face detecting means 2 and feature points of the face normalized by the face normalizing means 3 of the first embodiment of the system for video recording of the present invention. In FIG. 3, the position of right eye 22, the position of left eye 23, and the position of mouth 24, which are all detected by the face detecting means 2, are shown. Based on these positions, a face identifying region 25 is decided, and this region corresponds to the face identifying region signal 207 mentioned above. Next, the face normalizing means 3 applies designated normalization to the face identifying region 25, and outputs the normalized face image 26.

Figure 4:
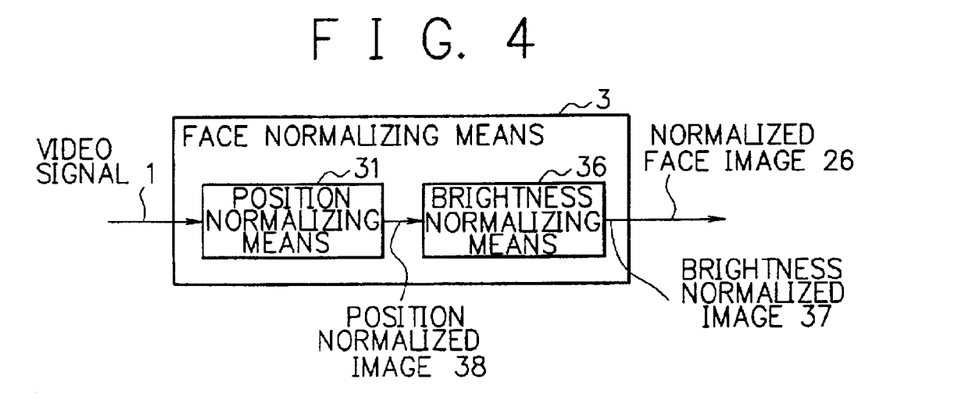
FIG. 4 is a block diagram showing a structure of the face normalizing means of the first embodiment of the system for video recording of the present invention.

FIG. 4 is a block diagram showing a structure of the face normalizing means 3 of the first embodiment of the system for video recording of the present invention. As shown in FIG. 4, the face normalizing means 3 consists of a position normalizing means 31 and a brightness normalizing means 36.

Referring to FIGS. 3 and 4, operation of the face normalizing means 3 of the present invention is explained. A face image detected from the video signal 1 is generally slanted in the right or left and its pose is unstable. And the brightness and contrast of the face image are different among parts. The position normalizing means 31 makes the image rotates, enlarge, and reduce by that the position of right eye 22, the position of left eye 23, and the position of mouth 24 are made to project a reference position of right eye 32, a reference position of left eye 33, and a reference position of mouth 34 respectively, and outputs a position normalized image 38 only in a face identifying reference region 35. Actually, when the coordinates of the position of right eye 22, the position of left eye 23, and the position of mouth 24 are defined to be (xr,yr), (xl,yl), and (xm,ym) respectively, and the coordinates of the reference position of right eye 32, the reference position of left eye 33, and the reference position of mouth 34 are defined to be (xr0,yr0), (xl0,yl0), and (xm0,ym0) respectively, each pixel (x,y) of the video signal 1 and each pixel (x',y') of the position normalized image 38 corresponding to the pixel (x,y) are shown as equations (2) and (3) respectively, under conditions that the position of mouth 24 is made to be a reference, and a and b are made to be parameters.

$$x-xm=a(xr-xm)+b(xl-xm)$$
$$y-ym=a(yr-ym)+b(yl-ym) \quad (2)$$
$$x'-xm0=a(xr0-xm0)+b(xl0-xm0)$$
$$y'-ym0=a(yr0-ym0)+b(yl0-ym0) \quad (3)$$

For each pixel (x',y') of the position normalized image 38, the parameters a and b are obtained from the equation (3), and the parameters a and b are substituted for the equation (2), and the (x,y) is obtained. With this, the pixel value of the pixel (x,y) of the video signal 1 is made to be the pixel value of the position normalized image 38, and the rotation, enlargement, and reduction of the image are completed.

The brightness normalizing means 36 normalizes the brightness of each pixel in the position normalized image 38 in the face identifying reference region 35, and outputs a brightness normalized image 37. Actually, for example, the average value and the standard deviation of the brightness Y (x,y) ((x,y) is the position of pixel) of each pixel in the face identifying region 25 of the position normalized image 38 are calculated. And at the brightness normalized image 37, the pixel values are normalized by an equation (4) so that these calculated average value and the standard deviation become a reference average value and a reference standard deviation respectively. In this, Y' (x,y) is a pixel value of the brightness normalized image 37.

$$Y'(x, y) = \overline{Y}_0 + \frac{\sigma_{y0}}{\sigma_y}(Y(x, y) - \overline{Y}). \quad (4)$$

The operation at the brightness normalizing means 36 is not limited to the operation mentioned above. For example, a histogram flattening process, in which a histogram of a brightness value of each pixel in the face identifying reference region 35 is flattened for all the pixel values, can be used.

In the face image database 5 shown in FIG. 1, the normalized face images 51 of one or more persons, normalized by the operation mentioned above, are stored beforehand. A user designates a person whom the user desires to record as an inquiring person by using the person designating means 4. As the person designating means 4, one of the existing method can be used. That is, the name of a person inputting method by inputting the name of the person from a keyboard, and a face image choosing method in which face images stored in the face image database 5 are displayed and a specified face image is chosen by using a pointing device such as a mouse, can be used.

In a technical survey, written by S. Akamatsu, "Recent Research on Face Recognition by Computer" in the Journal of the Institute of Electronics, Information and Communication Engineers, Vol. 80, No. 3, 1997, pp. 257–266, three face recognition methods are described. In this technical survey, following description is stated, that is, if a computer can handle and support a face recognition function to recognize a person, it can be largely expected to contribute to that a man-machine interface is made to be high, and the recognition of a full face of a person is studied. In the first method, image features that are stable in a face, which expresses macro shape information, such as color information of skin and hair, curves composed of symmetry and contours of the face, are obtained, or a face region being coarse-to-fine is retrieved by matching a mosaic image of multi-resolution. In the second method, the moving head part is tracked by applying a spatio-temporal filtering to an image sequence of a moving person in a scene, and the position of the head is narrowed down to a certain degree, after this, a face region is extracted as a face like scene image being closest to a sub space, in which a face image set distributed in a image space is formed, in arbitrary gray images cut out from adjacent to the narrowed down position, and a template matching is applied by using a face gray pattern. In the third method, a few prototypes are obtained in each class from a sampling set of image patterns in which two classes of a face part and a part except the face part are made to be mosaic, and a multi-layer perceptron, which classifies inputted patterns into two classes, using distance values between an inputted pattern and each prototype, is obtained by learning, and a face region is judged by using this obtained multi-layer perceptron, and a face pattern is extracted by a method, in which features distinguishing the face part from the other parts are obtained by case learning. As mentioned above, in these methods, the face image is retrieved by the full face image. At the embodiment of the present invention, any of these three methods can be used.

Next, there are two approaches to express features of a face pattern, that is, one is a feature-based approach, and the other is a pattern matching (template-based) approach. At the feature-based approach, the knowledge concerning a structure of a face is utilized, and the individuality of a person, being shapes and positions of features such as eyes, a nose, and a mouth, is focused on, and the feature points expressing these features are extracted, and the shapes of the features and the positions among the features are described. And at the pattern matching (template-based) approach, the knowledge of the structure concerning features and contours peculiar to the face is not utilized, and the face pattern is understood as an image to be expressed as the 2-D array of gray values in each pixel, and the face pattern is recognized by matching. Recently, this pattern matching (template-based) approach has been widely utilized, and a Gabor jet approach, in which the pattern matching is especially applied to a part pattern of a face, such as eyes and a mouth being the features of the face, and the periodic and directional characteristics of the part of the pattern are obtained by a wavelet transformation, has been proposed. At the Gabor jet approach, the face pattern is expressed by a graph and is combined with the feature-based approach, and the face recognition is realized.

The normalized face image 51 of a designated inquiring person is outputted from the face image database 5 to the face identifying means 6. When the size, orientation, and direction of the lightning of the normalized face image 51 are matched with the inputted face image in the inputted video signal 1, the degree of similarity becomes high, and the degree of conformity becomes high at the time of identification. The face identifying means 6 identifies whether the normalized face image 26 outputted from the face normalizing means 3 conforms with the normalized face image 51 outputted from the face image database 5 or not.

Figure 5:
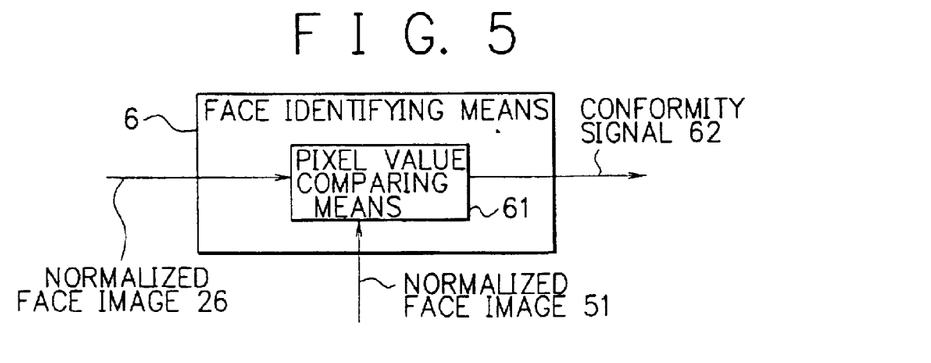
FIG. 5 is a diagram showing a structure of a face identifying means at the first embodiment of the system for video recording of the present invention.

FIG. 5 is a diagram showing a structure of the face identifying means 6 at the first embodiment of the system for video recording of the present invention. The face identifying means 6 provides a pixel value comparing means 61. The pixel value comparing means 61 compares pixel values of the normalized face image 26 (brightness normalized image 37) with pixel values of the normalized face image 51 in both the face identifying regions 25 and 35. In the comparing process, the sum of the absolute values of the differences between the pixel values in each pixel, or the sum of the square of the differences between the pixel values in each pixel is compared with a threshold value. And when this compared result is smaller than the threshold value, the pixel value comparing means 61 outputs a conformity signal 62. As a method to realize the face identifying means 6, there are existing methods having high efficiency, for example, the feature-based approach and the template-based approach reported by S. Akamatsu mentioned above. These methods can be applied to this face identifying means 6.

The controlling means 7 receives the conformity signal 62 and outputs a video recording control signal 71 to the video signal recording means 9. The video signal delay means 8 stores the video signal 1 temporarily and makes the video signal 1 delay for a designated minutes and outputs the delayed video signal 1. This video signal delay means 8 can be realized by such as a semiconductor memory, a magnetic disk, and computer storage and a computer program. For example, at a case that the delay time of the video signal delay means 8 is 10 minutes, the video signal recording means 9 receives the video signal 1 that was received 10 minutes before at the video signal delay means 8. The video signal recording means 9 records the video signal 1 outputted from the video signal delay means 8 only while the video signal recording means 9 is receiving the video recording control signal 71. With this, the video signal recording means 9 records the video signal from 10 minutes before the time when a designated person appears on the video signal 1 and the face of the designated person is detected and identified to be recorded. The condition for output of the video recording control signal 71 can be set to the controlling means 7 depending on user's purposes.

For example, it is set that the video recording control signal 71 is outputted for 10 minutes after a designated person is detected and identified in the video signal. It is especially easy to change this setting, at a case that the video signal delay means 8 is realized by computer storage and a program of a computer. At a TV program, even a leading actor/actress does not always appear on a screen, however, at a case that it is supposed that the leading actor/actress appears once 10 minutes, with this setting mentioned above, scenes, in which the leading actor/actress appears, can be recorded without almost failing.

At the first embodiment of the present invention mentioned above, recording the scenes, in which a person designated by a user is appearing on a screen, is explained. Further, at the first embodiment of the present invention, not recording scenes, in which a person designated by a user is appearing on a screen, can be realized. Usually, the controlling means 7 outputs the video recording control signal 71 to the video signal control means 9, however, in this case, the controlling means 7 stops outputting the video recording control signal 71 to the video signal recording means 9 for designated minutes including before and after the designated person appears, when the conformity signal 62 is inputted to the controlling means 7.

At the first embodiment of the present invention, in order to make the explanation concise, the number of the designated person is set to one, however, the number of the designated persons is not limited to one, but can be plural persons. For example, plural persons A, B, . . . are designated, and when any of the plural designated persons is detected, the video recording is started. And at a case of not recording, any of the plural designated persons is detected, the video recording is stopped. This structure can be realized by the present invention.

In order to make the present invention highly effective, it is necessary that the identification of face succeeds in high reliability. For achieving this, the face image database 5 must store images of plural persons who are in various poses and also at various backgrounds, and a face image in the video signal 1 is compared with each of the stored images, with this, the reliability is made to be high. At the first embodiment of the present invention, the normalized face images 26 of the designated persons are already stored in the face image database 5.

Figure 6:
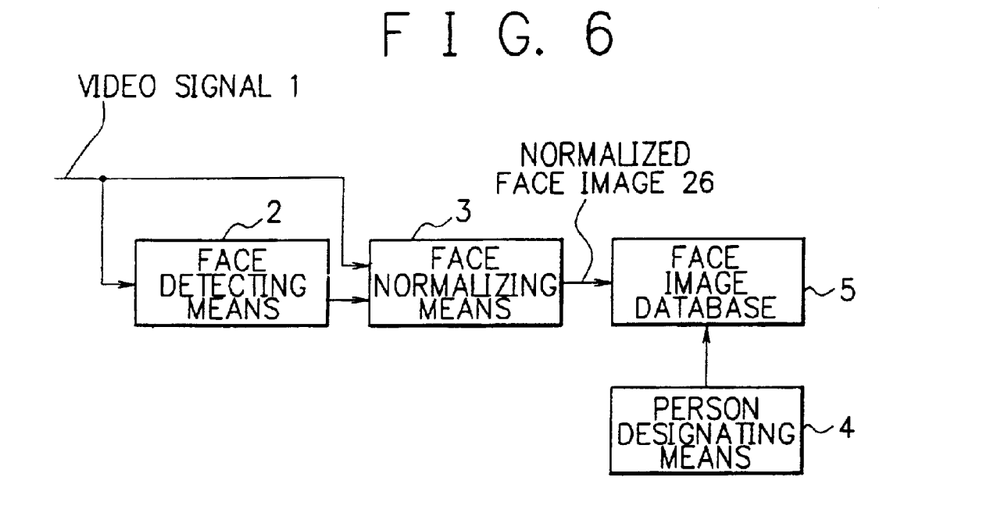
FIG. 6 is a block diagram showing a structure for enhancing a face image database at the first embodiment of the system for video recording of the present invention.

FIG. 6 is a block diagram showing a structure for enhancing the face image database 5 at the first embodiment of the system for video recording of the present invention. For example, as the same as in FIG. 1, a face image in a video signal 1 is detected at a face detecting means 2, and the detected face image is normalized at a face normalizing means 3 and a normalized face image 26 is outputted. At a case that this face image is a face image of a designated person whom a user desires to register, the user designates the person by using a person designating means 4 and registers the person in the face image database 5.

As another method for enhancing the face image database 5, a following method can be used. For persons such as actors, actresses, and TV personalities whom many users generally desire to record, first a face image database of these persons in various poses and also at various backgrounds is made by getting approval of the persons, and a service to deliver and distribute the face image database to users who desire to have. With this, the users can save time to make their face image database.

At the first embodiment of the present invention mentioned above, a person is identified by his/her face image, however, it is not limited to the face image. And a technology to identify a person by using a voice print has been developed, this identification by using the voice print can be used at the present invention.

Further, at the first embodiment of the present invention, a face image is an object to be identified, however, a static object such as a natural spectacle and a building, and a dynamic object can be objects to be identified. In this case, when these objects are normalized and stored in a database beforehand, at a case that one of these objects appears on a TV scene, this object is normalized and identified, and the video image of the object is recorded from a few frames before the video image appears through a few frames after the video image disappears.

As mentioned above, at the first embodiment of the present invention, only scenes, in which designated persons and/or designated objects are appearing, can be recorded. Further, by applying the present invention to a recorded medium such as a recorded tape, when an inquiring object is designated, images including before and after screens, in which the designated object such as a person and a natural spectacle is appearing, can be retrieved. In this case, the database being the recorded tapes is installed in such as a library, and the images including before and after the screens that are desired by a user can be obtained. With this, it is different from a conventional retrieving system that a user retrieves an image by watching a screen, the image can be retrieved automatically.

And further, when the present invention is applied to a reproduced signal of a recording medium in which a recorded program is stored, a video image editing system for making a personal individual video album from the reproduced signals can be realized. And when the present invention is applied to a video signal obtained from a security camera, a security system, in which a part recorded only a specified person is extracted, can be realized.

Further, at a case that a user is recording a program from a broadcasting station in a video tape recorder (VTR), when a desired face image is detected, the user makes the VTR continue to record the program. And also the user can makes another recording medium such as a hard disk record frames from a few frames before the desired face image appears through a few frames after the desired face image disappears.

Moreover, as a recording medium at the present invention, not only a VTR and a digital video disk (DVD)-RAM, and also many kinds of recording media such as a hard disk and a floppy disk can be used.

Next, as a second embodiment of the present invention, a case that a system for audio recording is explained. At a case that a designated audio signal is detected, recording including phrases before and after a phrase, in which the designated audio signal appears, or not recording the phrases are explained.

Figure 7:
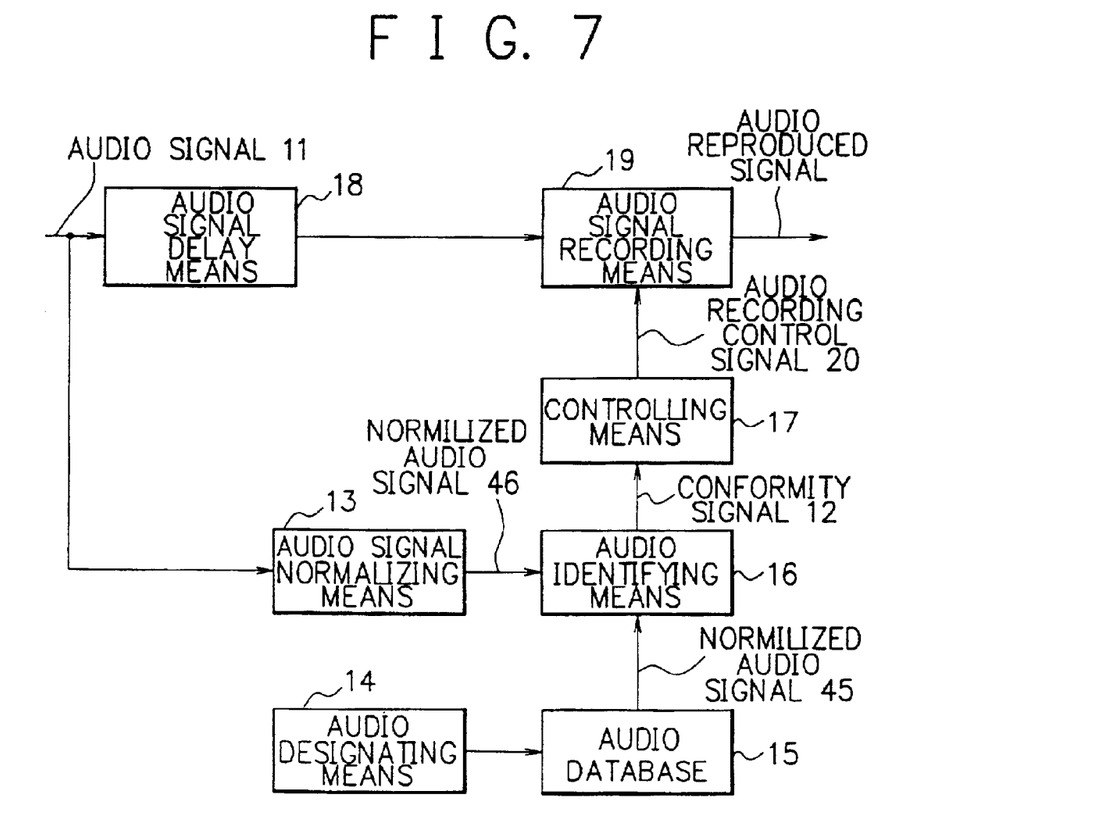
FIG. 7 is a block diagram showing a structure of a second embodiment of the system for video recording of the present invention at the case that an audio signal is recorded.

FIG. 7 is a block diagram showing a structure of a second embodiment of the system for video recording of the present invention at the case that an audio signal is recorded. At the case that an image is detected, a face image can be detected every one frame or every one field. However, at the case of a voice, a continuous voice is compared with a voice to be compared by a pattern matching method (overlapping method) at real time, and it is judged whether the compared result is matched or not. Especially, at the case of voice, the characteristic of the voice of each person is generally judged by its formant frequency characteristic, therefore, this technology can be used at this embodiment.

As shown in FIG. 7, the second embodiment detecting a voice of the present invention consists of an audio signal normalizing means 13, an audio designating means 14, an audio database 15, an audio identifying means 16, a controlling means 17, an audio signal delay means 18, and an audio signal recording means 19.

Referring to FIG. 7, operation of the second embodiment detecting a voice of the present invention is explained. First, the audio designating means 14 designates a voice to be detected. For example, a voice of a famous actor is extracted from voices stored in the audio database 15 at 127 ms unit. The audio database 15 normalizes this voice by that a peak level of this voice in this designated 127 ms period is made to be a constant value A, and outputs a normalized audio signal 45. An audio signal 11 to be detected is inputted to the audio signal normalizing means 13, and 127 ms period is divided into 10 or more sample being a short period, and a peak level in the 127 ms period is made to be the same level of the constant value A and a normalized audio signal 46 is outputted from the audio signal normalizing means 13. The audio identifying means 16 detects the difference between the normalized audio signal 45 from the audio database 15 and the normalized audio signal 46 from the audio signal normalizing means 13 by the pattern matching method. And at a case that the difference is smaller than a designated threshold value, it is judged that the both normalized audio signals 45 and 46 are conformed. At this pattern matching method, the 127 ms period is divided into about 100 samples and the both normalized audio signals 45 and 46 are compared.

Before applying this pattern matching method, the spectra in the 127 ms period to be compared may be compared. That is, a spectrum analysis is applied to the 127 ms period of the normalized audio signal 45 by a spectrum analyzer, and the amount of energy in each band is accumulated, and also the same analysis is applied to the normalized audio signal 46 by the same analyzer, and both the amount of energies are compared based on the results by the spectrum analysis. At this time, when the both are conformed, the pattern matching method is applied and it is judged whether the both are conformed or not. The voice spectrum of a person is different from that of the other persons, because each person has his/her own vocal organ having a different physical structure, a speaking habit, and in some cases, a dialect and a special accent. Therefore, when the similarity of the both normalized audio signals 45 and 46 is desired to obtain in more detail, at the audio identifying means 16, the formant frequency, the frequency band, and the shape of the spectrum of the normalized audio signal 45 is compared with those of the normalized audio signal 46, and further the time pattern of the formant frequency and the time length of a word is compared in the both normalized audio signals 45 and 46. With this, the audio identifying means 16 comprehensively judges whether the normalized audio signals 45 and 46 are conformed or not by using the mentioned above comparisons. And a scene, in which a special voice is spoken, can be specified, by changing the 127 ms period arbitrary,.

The audio identifying means 16 outputs a conformity signal 12 to the controlling means 17 when the both normalized audio signals 45 and 46 are conformed. The controlling means 17 received the conformity signal 12 outputs an audio recording signal 20 to the audio signal recording means 19. The audio signal recording means 19 records audio signals delayed at the audio signal delay means 18 including before and after a designated time, for example, for about one minute, when the audio recording control signal 20 is received. Or the controlling means 17 can make the audio signal recording means 19 stop the recording by using the audio recording control signal 20.

As mentioned above, referring to FIG. 7, the second embodiment, in which the recording is controlled by the audio identification instead of the face image identification, is explained. Further, referring to FIGS. 1 and 7, a system for recording audio and video signals combined the audio identification and the face image identification is explained.

Generally, a picture signal includes a video signal and an audio signal. In this, the picture signal is defined as a signal composed of a video signal and an audio signal. At the case of NTSC system, the frequency band width of the video signal is 0 to 4.5 MHz and the carrier frequency of the video signal is 1.25 MHz, and the carrier frequency of the audio signal is set to be 4.5 MHz higher than that of the video signal and the frequency modulation (FM) is applied to the audio signal. Therefore, in order to obtain the audio signal 11 shown in FIG. 7, an audio separation circuit, which makes a high frequency component in the carrier frequency pass, is provided. At this case, the audio separation circuit provides an FM demodulating circuit, and a frequency modulated audio signal is demodulated to a base band signal at the FM demodulating circuit, and this demodulated audio signal is inputted as the audio signal 11. And the video signal delay means 8 and the audio signal delay means 18 can be combined to one unit, and the video signal 1 and the audio signal 11 are delayed for designated minutes. As this delay means, a hard disk, a CD-R, or a CD-RW can be used.

And the face image database 5 and the audio database 15 can be combined into one unit, and also the person designating means 4 and the audio designating means 14 can be combined into one unit, and an inquiring object is designated by using a keyboard or a mouse. In this case, a designated voice in a designated period, or a designated face image or a designated object in one frame of the video signal, is designated. This designation can be executed as a logical sum OR, in which only an audio signal is designated or only a video signal is designated separately. Or this designation can be executed as a logical product AND, in which an audio signal and a video signal are added. These designating means makes an inquiring object or an inquiring voice desired by a user display on a display (not shown) and designates the inquiring object or the inquiring voice.

And the face normalizing means 3 normalizes a face image or an object image, and also the face image database 5 normalizes an inquiring object, and these normalized images are inputted to the face identifying means 6 (object identifying means). When these normalized images are conformed, or the similarity of these normalized images is higher than a designated threshold value at the face identifying means 6 (object identifying means), the conformity signal 62 is outputted to the controlling means 7. And also, at the case of an audio signal, at the audio identifying means 16, a normalized inquiring audio signal and a normalized inputted audio signal are compared, and when these audio signals are conformed or the similarity of these audio signals is high, the conformity signal 12 is outputted to the controlling means 17.

Next, the controlling means 7 outputs the video recording control signal 71 that instructs the video signal recording means 9 to record frames being including before and after a frame in which the conformity signal 62 is detected. And also, the controlling means 17 outputs the audio recording control signal 20 that instructs the audio signal recording means 19 to record audio signals including before and after a time in which the conformity signal 12 is detected. With this, this video and/or audio recording can be executed flexibly, depending on contents designated at the person designating means 4 and the audio designating means 14.

At this video and audio combined recording system, even when an inquiring object is only a voice, audio and video signals can be recorded at a case that a designated audio signal is detected. Therefore, for example, when a user desires to have information of a famous person who appears on TV frequently, the user designates the face image and the voice of the famous person, and even at a case that only the voice appears, the video and audio recording can be executed. Consequently, the user can fully obtain the information of the famous person.

As mentioned above, according to the present invention, only a part, which a specified person designated by a user is appearing, can be recorded, and an unnecessary part is not recorded. Therefore, a recording medium can be used effectively. And also, it is possible that only a part, which a specified person designated by a user is appearing, is not recorded.

And at the conventional video recording system, when a program is prolonged for some minutes, a designated program after the program can not be recorded properly. However, at the present invention, the starting time of the designated program is automatically changed by the designation of a face image and/or a voice, therefore, the designated program can be recorded.

Further, when the present invention is built in a VTR or a video disk recorder, the function of the product is made to be wide. And by using a computer and its storage, editing of video images of a specified person/object, such as making an individual video album, can be executed automatically.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method for video recording, comprising the steps of:
    detecting an inputted face image from a video signal composed of plural frames;
    identifying said inputted face image with an inquiring face image designated by a user; and
    recording video signals including frames before and after a frame in which said inquiring face image appears for designated minutes when identification between said inputted face image and said inquiring face image was successful.

2. A method for video recording in accordance with claim 1, wherein:

said inputted face image is normalized by a standard face image, and said normalized inputted face image is identified with a normalized face image of said inquiring face image, and when said normalized inputted face image was similar to said normalized inquiring face image in a degree exceeded a designated similarity, said identification was successful.

3. A method for video recording, comprising the steps of:

detecting an inputted face image from a video signal composed of plural frames;

identifying said inputted face image with an inquiring face image designated by a user; and not recording video signals including frames before and after a frame in which said inquiring face image appears for designated minutes when identification between said inputted face image and said inquiring face image was successful.

4. A method for video recording in accordance with claim 3, wherein:

said inputted face image is normalized by a standard face image, and said normalized inputted face image is identified with a normalized face image of said inquiring face image, and when said normalized inputted face image was similar to said normalized inquiring face image in a degree exceeded a designated similarity, said identification was successful.

5. A system for video recording that records video signals including frames before and after a frame in which an object to be recorded appears for designated minutes by detecting said object to be recorded, comprising:

an object to be recorded detecting means for detecting feature points of said object to be recorded from an inputted video signal;

an object to be recorded normalizing means for normalizing said object to be recorded by utilizing said feature points of said object to be recorded;

an inquiring image designating means for designating an inquiring image beforehand and normalizing said inquiring image and outputting said normalized inquiring image;

an object identifying means for identifying said normalized object to be recorded with said normalized inquiring image; and a controlling means for controlling video recording based on the result of said object identifying means.

6. A system for video recording in accordance with claim 5, wherein:

said object to be recorded detecting means, comprising:

a resolution transforming means for transforming resolution of said inputted video signal;

a filtering means for detecting feature points of said inputted video signal whose resolution was transformed; and a hypothesis testing means for testing a relation of positions among said feature points of said inputted video signal and outputting an identifying region signal.

7. A system for video recording in accordance with claim 5, wherein:

said object to be recorded normalizing means, comprising:

a position normalizing means for normalizing the position and the size of said object to be recorded in coordinates by utilizing positions of said feature points; and a brightness normalizing means for normalizing brightness of said feature points in digital numbers.

8. A system for video recording in accordance with claim 5, wherein:

said object identifying means, comprising:

a pixel value comparing means for comparing a normalized signal being a brightness signal or a color signal of said object to be recorded outputted from said object to be recorded normalizing means with a normalized signal being a brightness signal or a color signal of said normalized inquiring image, wherein:

it is judged whether the changing degree of brightness of said normalized object to be recorded and said normalized inquiring image is conformed or not by a predetermined threshold value.

9. A system for video recording in accordance with claim 5, wherein:

said object to be recorded is a face image, and said inquiring image designating means designates a person, and said face image is normalized based on a standard face image.

10. A computer program storing medium of a method for video recording that records video signals when a designated object is detected from an inputted video signal, comprising the steps of:

detecting said designated object from plural frames of said inputted video signal;

identifying said designated object with an inquiring image designated by a user; and recording video signals including frames before and after a frame in which said inquiring image appears for designated minutes when identification between said designated object and said inquiring image was successful.

11. A computer program storing medium of a method for video recording that records video signals when a designated object is detected from an inputted video signal, comprising the steps of:

detecting said designated object from plural frames of said inputted video signal;

identifying said designated object with an inquiring image designated by a user; and not recording video signals including frames before and after a frame in which said inquiring image appears for designated minutes when identification between said designated object and said inquiring image was successful.

12. A method for audio recording, comprising the steps of:

detecting a phrase of designated minutes continuously from an inputted audio signal;

identifying said detected phrase of said designated minutes with a phrase of the same designated minutes of an inquiring audio signal designated by a user; and recording audio signals including phrases before and after a phrase in which said inquiring audio signal appears for designated minutes when identification between said phrase of said inputted audio signal and said phrase of said inquiring audio signal was successful.

13. A method for picture recording, comprising the steps of:

delaying inputted picture signals;

separating said inputted picture signals into video signals and audio signals;

dividing each of said video signals into frames;

normalizing said video signals based on feature points in said frames;

dividing each of said audio signals into phrases of designated minutes;

normalizing said audio signals based on levels in said designated minutes;

using at least either one, an inquiring image designated beforehand or an inquiring voice of said designated minutes designated beforehand;

normalizing at least either one, said inquiring image designated beforehand or said inquiring voice of said designated minutes designated beforehand;

identifying at least either one, said normalized video signal or said normalized audio signal, with at least either one, said normalized inquiring image or said normalized inquiring voice; and recording or not recording said picture signals for predetermined minutes from certain minutes before the time when identification was successful to after said time at the case that said identification was successful.

14. A method for audio recording, comprising the steps of:

delaying inputted picture signals;

separating said inputted picture signals into video signals and audio signals;

dividing each of said video signals into frames;

normalizing said video signals based on feature points in said frames;

dividing each of said audio signals into phrases of designated minutes;

normalizing said audio signals based on levels in said designated minutes;

using at least either one, an inquiring image designated beforehand or an inquiring voice of said designated minutes designated beforehand;

normalizing at least either one, said inquiring image designated beforehand or said inquiring voice of said designated minutes designated beforehand;

identifying at least either one, said normalized video signal or said normalized audio signal, with at least either one, said normalized inquiring image or said normalized inquiring voice; and recording or not recording said audio signals in said picture signals for predetermined minutes from certain minutes before the time when identification was successful to after said time at the case that said identification was successful.

15. A method for video recording, comprising the steps of:

delaying inputted picture signals;

separating said inputted picture signals into video signals and audio signals;

dividing each of said video signals into frames;

normalizing said video signals based on feature points in said frames;

dividing each of said audio signals into phrases of designated minutes;

normalizing said audio signals based on levels in said designated minutes;

using at least either one, an inquiring image designated beforehand or an inquiring voice of said designated minutes designated beforehand;

normalizing at least either one, said inquiring image designated beforehand or said inquiring voice of said designated minutes designated beforehand;

identifying at least either one, said normalized video signal or said normalized audio signal, with at least either one, said normalized inquiring image or said normalized inquiring voice; and recording or not recording said video signals in said picture signals for predetermined minutes from certain minutes before the time when identification was successful to after said time at the case that said identification was successful.

16. A method for video recording in accordance with claim 1, further comprising the step of:

delivering or distributing said inquiring image.

17. A method for video recording in accordance with claim 3, further comprising the step of:

delivering or distributing said inquiring image.

18. A system for video recording in accordance with claim 5, further comprising:

a delivering or distributing inquiring image means for delivering or distributing said inquiring image.

19. A method for picture recording in accordance with claim 13, further comprising the step of:

delivering or distributing said inquiring image.

20. A method for video recording in accordance with claim 15, further comprising the step of:

delivering or distributing said inquiring image.

21. A method for audio recording in accordance with claim 12, further comprising the step of:

delivering or distributing said inquiring voice.

22. A method for picture recording in accordance with claim 13, further comprising the step of:

delivering or distributing said inquiring voice.

23. A method for audio recording in accordance with claim 14, further comprising the step of:

delivering or distributing said inquiring voice.

24. A method for picture recording in accordance with claim 13, further comprising the step of:

delivering or distributing at least either one, said inquiring image or said inquiring voice.

* * * * *